(12) United States Patent
Kigel et al.

(10) Patent No.: US 8,025,798 B2
(45) Date of Patent: Sep. 27, 2011

(54) MODULAR BIOLOGICAL FLUIDIZED BED REACTOR SYSTEM

(75) Inventors: Mark Y. Kigel, East Brunswick, NJ (US); Oleksandr O. Kovelenko, Kiev (UA); Leonard B. Goldman, Edison, NJ (US); John F. Shultis, Plainsboro, NJ (US)

(73) Assignee: MYK Consultant, Inc., East Brunswick, NJ (US)

( * ) Notice: Subject to any disclaimer, the term of this patent is extended or adjusted under 35 U.S.C. 154(b) by 622 days.

(21) Appl. No.: 12/075,045

(22) Filed: Mar. 7, 2008

(65) Prior Publication Data

US 2009/0107924 A1    Apr. 30, 2009

Related U.S. Application Data

(60) Provisional application No. 61/000,268, filed on Oct. 24, 2007.

(51) Int. Cl.
*B01D 35/00*    (2006.01)

(52) U.S. Cl. ............... 210/173; 210/195.1; 210/196; 210/220; 210/512.1; 210/512.2

(58) Field of Classification Search ........... 210/173, 210/195.1, 196, 220, 512.1–512.2
See application file for complete search history.

(56) References Cited

U.S. PATENT DOCUMENTS

| | | | | |
|---|---|---|---|---|
| 3,718,582 A * | 2/1973 | Smith et al. | ............... | 210/610 |
| 3,956,128 A | 5/1976 | Turner | | |
| 4,352,740 A * | 10/1982 | Grader et al. | ............... | 210/760 |
| 4,443,337 A * | 4/1984 | Otani et al. | ............... | 210/602 |
| 4,707,252 A | 11/1987 | Durot et al. | | |
| 4,787,978 A | 11/1988 | Nicol | | |
| 4,869,815 A | 9/1989 | Bernard et al. | | |
| 5,298,172 A * | 3/1994 | Smith | ............... | 210/747 |
| 6,159,365 A * | 12/2000 | Kigel et al. | ............... | 210/151 |
| 2008/0251451 A1 * | 10/2008 | Christian et al. | ............... | 210/614 |

* cited by examiner

*Primary Examiner* — Chester Barry
(74) *Attorney, Agent, or Firm* — Robert L. Stone

(57) ABSTRACT

A biological wastewater treatment process and modular apparatus wherein activated sludge is recirculated in all of aeration, fluidized bed and return sludge phases in the apparatus.

14 Claims, 2 Drawing Sheets

US 8,025,798 B2

MODULAR BIOLOGICAL FLUIDIZED BED REACTOR SYSTEM

This application claims domestic priority from Provisional Application No. 61/000,268, filed Oct. 24, 2007.

FIELD OF THE INVENTION

This invention relates to methods and apparatus for removal of organic biodegradable impurities measured by Biochemical Oxygen Demand (BOD) from municipal and industrial wastewater.

BACKGROUND AND PRIOR ART

The safe and efficient collection and treatment of wastewater is vital to communal health. However, municipal wastewater collection and treatment systems have produced flow fluctuations and low wastewater contaminant concentrations.

The biological wastewater treatment processes and facilities based on the activated sludge method consist of three major components: aeration tanks or zones, secondary sedimentation phase tanks or zones, and return sludge systems. In a conventional process modifications all three components have been physically separated, each from the others. In order to maximize the treatment system capacity and efficiency, the activated sludge concentration measured by Mixed Liquor Suspended Solids ("MLSS") should be maintained as high as possible. However, the suspended solids sedimentation efficiency has been limited by the hydraulic conditions in the secondary sedimentation tanks. Most frequently, the gravity settling conditions have allowed maintaining the MLSS no higher than about 3,000-3,500 mg/L (ppm), which is below a level desired for optimum capacity and efficiency.

In the combined modifications herein for clarifying the sludge, the aeration tanks are (1) hydraulically connected with the phase separation for clarifying sludge and (2) the recirculation of the return sludge is provided by the intensity of aeration in the aeration zone causing liquid inflow from the clarification phase zone into the aeration zone. In this case, the MLSS can be increased to about 5,000-5,500 mg/L or more, thus increasing the capacity and efficiency of the treatment facility. Thus, the combined activated sludge treatment processes and facilities are more efficient than the conventional systems.

A goal of the present invention is to develop a cost-effective and efficient method and a combined unit that would maximize the MLSS in the activated sludge return flow, thus minimizing the intensity of aeration necessary to provide recirculation between the aeration and phase clarification zones.

The following is a brief description of the combined process-apparatus units of the prior art.

U.S. Pat. No. 6,159,365 to Kigel et al, issued Dec. 12, 2000, describes a method and apparatus for treating contaminated water, in particular wastewater, in a packaged modular treatment unit which is considered a fluidized bed reactor. The increase in the MLSS is provided by laminarization cartridges installed in the clarification zones as well as by a depressed bottom compartment in the clarification zone. Although the unit is desirable as it provides maintaining the MLSS up to about 7,000 mg/L this method and apparatus, nevertheless, has a significant drawback of the present invention compared to the currently described method and apparatus in that the necessity of increased aeration intensity for return sludge recirculation results in two-stage aeration for liquid inflow from the depressed bottom compartment.

U.S. Pat. No. 4,787,978 to Nicol, issued Nov. 29, 1988, describes a method for the purification of urban wastewater using highly concentrated activated sludge of a daily pollution sludge value ("BOD") of about 10-15 kg $BOD/m^3/day$, instead of an earlier used concentration of about 0.5-2.5 kg, thus increasing the efficiency of the use of the reaction volume. The increase in activated sludge concentration is achieved by separate thickening of the return sludge in a laminarization (inclined parallel plate) sedimentation tank. However, this method has the substantial disadvantage of being extremely complicated when compared with the fluidized bed reactors which combine the reaction and phase separation volumes in a single apparatus.

U.S. Pat. No. 4,707,252 to Durot et al, issued Nov. 17, 1987, describes a fluidized bed reactor for aerobic or non-aerobic biological treatment of wastewater which contains a fluidized bed of granular material. The treatment process is based on the three-phase gas-liquid-solids reactions and includes a device for removing air bubbles, a device for separation of the solid particles from the bacterial floc and from the discharged effluent, and a device for recirculation of the effluent which is a means for fluidization of the bed of granular material. Despite advantages it provides, it, nevertheless, has the drawback in that it is a very complex apparatus including numerous sections and compartments as well as moving parts which add to the cost of its maintenance and operation ("O&M"). Another drawback of the reactor is likely media channeling caused by a plug-flow fluidization regime. The channeled upward flow fluidization can result in inefficient use of the fluidized bed volume.

U.S. Pat. No. 4,869,815 to Bernard et al, issued Sep. 16, 1989, describes a fluidized bed reactor for biological treatment of liquids which contains granular media fluidized by the liquid to be treated. To avoid channeling, the fluidized media is supported by a flow distribution granular transfer material. The transfer material can compensate for the major disadvantage of the plug-flow upward fluidization of the fluidized granular media—potential media channeling. However, this again has the substantial drawback of being very complex.

U.S. Pat. No. 3,956,128 to Turner, issued May 1, 1976, describes an apparatus for treating industrial and domestic wastewater which is a cylindrical system divided into two concentric tanks, thus forming an intermediate space, considered to be an aeration chamber. The liquid is oxygenated under pressure and pumped through a spiral tube for transfer of soluble impurities into insoluble suspended particles by a conventional biochemical oxidation process. The admixture from the spiral tube which is released into the central zone where the activated sludge solids rise upward due to dissolved air, flotation are then collected on the surface and returned back to the process, and the separated effluent (subnatant) is removed from the reactor. The system requires pumps and devices for saturation of the liquid with the air as well as devices for collection and removal of floated scum, again making the apparatus highly complex. Another disadvantage of the reactor is that the spiral tube, which winds around outside the tank and is needed to make the system operate, is difficult and costly to construct.

SUMMARY OF THE INVENTION

The packaged modular unit of the present invention includes modules (equipment, tanks or zones) for grinding the coarse impurities in wastewater flow to a particle size suitable for an essentially total oxidation process, with grit removal tangential chambers, and a device for mechanical dewatering of excess sludge; these being the combined modules for biological treatment and for treated effluent disinfection.

The arrangement of the modular treatment unit contributes to the construction units being readily suitable for prefabrication, thereby reducing construction time and start-up preparation.

The treatment process technology does not include anaerobic processes, thereby avoiding odors and other adverse environmental impacts. For the same reason, sanitary control areas can be reduced, thus decreasing land requirements.

It is an object of the present invention to provide a continuous process and apparatus in a form of a packaged modular type unit for conducting biological wastewater treatment.

It is a further object to provide a fluidized bed reactor with appropriate hydraulic conditions for aeration, formation of a fluidized bed, liquid mass recirculation between all hydraulic zones—and thereby efficiently maintaining a high reaction mass concentration within the reaction volumes.

It is a further object to provide a high concentration of activated sludge in the sludge thickening bottom compartment prior to its return to the aeration zone using recirculation flow directing tubes providing suction and high MLSS inflow from the sludge separation zone thus decreasing energy consumption for aeration.

In accordance with the objects, the invention provides a method and apparatus for wastewater treatment providing continuous reduction of organic biodegradable impurities.

The apparatus contains a reactor which comprises hydraulic zones of aeration, recirculation, gas bubble removal, liquid-liquid fluidization, fluidized bed effluent removal, excess sludge removal, recirculation flow directing tubes, conduits, means, controlled openings, and intermediate piping to hydraulically connect all above zones and compartments.

DESCRIPTION OF THE PREFERRED
APPARATUS AND TREATMENT METHOD
EMBODIMENT

Figure 1:
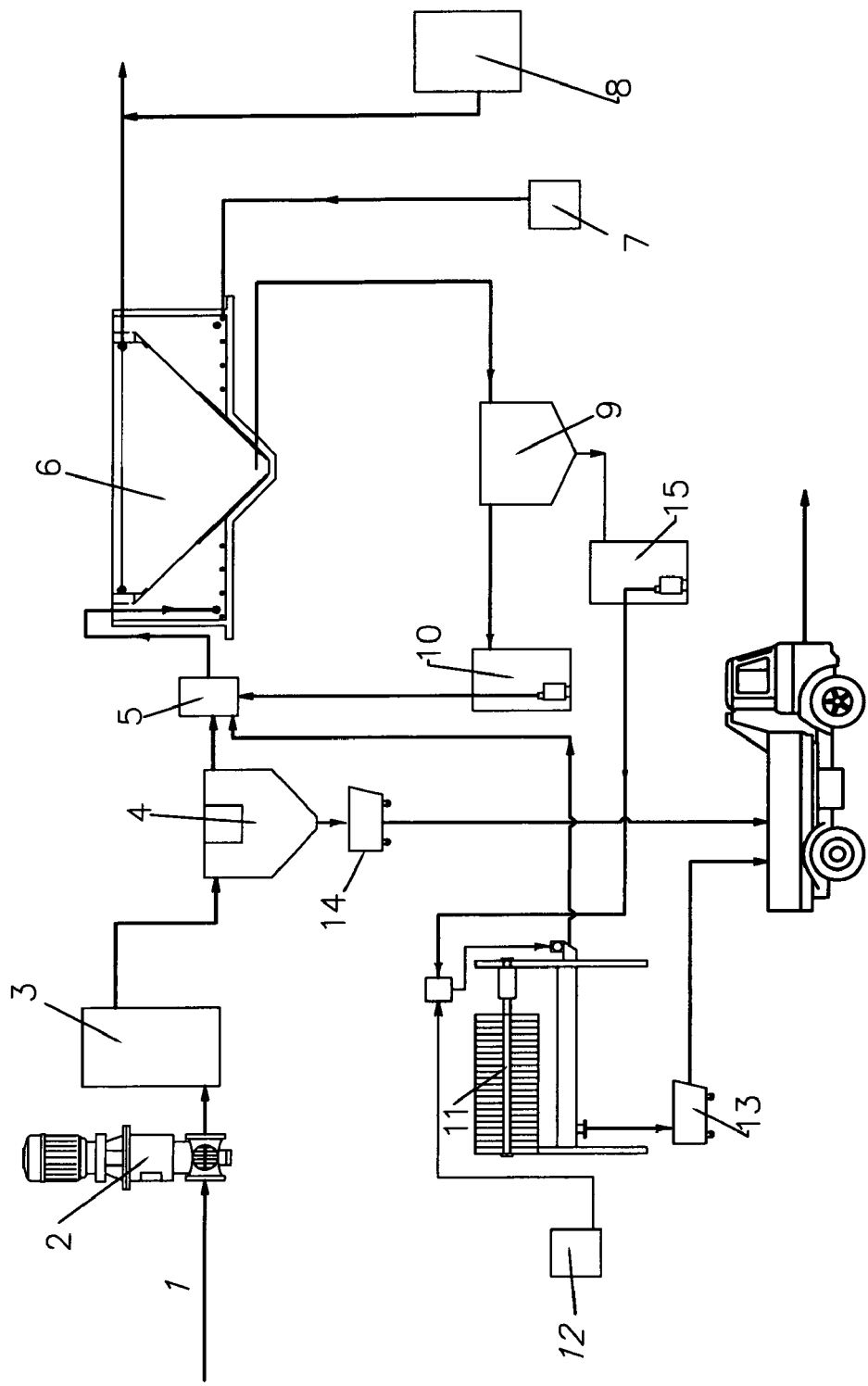
FIG. 1 is a diagram of the apparatus indicating the apparatus components and the flow of the process.

The major components of the apparatus are the disintegrator, the tangential grit removal chamber, the aeration tank-clarifier, the filter press, the disinfection system, and auxiliary equipment (see FIG. 1). Raw wastewater 1, preferably, drawn from a pressure line, for example, is delivered to disintegrator 2 and subsequently enters head suppression chamber 3.

The disintegrator is used for grinding the coarse impurities in the wastewater flow. It provides efficient grinding down to a particle size of about 6 mm or less, and typically between about 4 to 6 mm. This small particle size is important for subsequent efficient biological oxidation of the organic material.

The disintegrator efficiently grinds the coarse impurity particles within the wastewater flow.

The disintegrator has a labor body containing two functional parts; a stationary cutting fixed frame and a spherical rotating cutting element. The cutting ends of the spherical rotating cutting element move between the cutting elements of the stationary cutting fixed frame to grind the particles and clean the space between the cutting elements. The cutting elements efficiently work at the double-directional rotation of the spherical rotating cutting element. The disintegrator is provided with a control panel that monitors performance of the spherical rotating cutting element. The direction of rotation is automatically changed each time the machine is switched on. This provides uniform wear of the cutting elements and, therefore, more durable service life of the equipment.

The disintegrator used in the described block-modular wastewater treatment unit is characterized by few working parts, by low pressure drop, and by high reliability of operation. The machine uses low velocities of the moving cutting elements at high twisting moment which provides high efficiency of grinding the particles of impurities and leaving the ground small size particles within the wastewater flow. High efficiency of grinding results in a very high surface area of the ground suspended solids having a particle size of about 6 mm or less. As indicated above, this is important for subsequent contact between the organic particle of the suspended solids and the activated sludge floc that will occur.

The innovative structure of the spherical rotating cutting element with an open center provides a high degree of the use of cutting element surface area and low hydraulic resistance for the apparatus. The cutting elements are typically made of stainless steel with a sprayed or fused coating on all cutting surfaces.

The disintegrator provides efficient grinding of coarse particles typically found in communal wastewater, such as domestic solid wastes, livestock products, synthetic plastic materials, wood, carpeting materials, paper, cardboard, fish processing wastes, canning wastes, etc. High efficiency grinding, particularly, is very important for dewatering of the excess sludge in the filter press. The finer the particles are, the higher the dewatering efficiency is achieved.

After the disintegrator and head suppression chamber, the wastewater is directed to a conical tangential grit removal chamber 4. In the tangential grit removal chambers, the centripetal forces provide concentration of the heavy mineral particles in the center of the chamber. The grit settles down in the 60° conical bottom where it is accumulated and then removed by gravity to container 14. The incoming wastewater enters the ring-shaped space tangentially between an internal cylinder and the encasement, thus creating rotation of the liquid around the internal cylinder similar to the hydraulic pattern in hydrocyclones. At the lower edge of the internal cylinder, the heavier mineral particles (grit) are separated from the tangential flow, concentrated along the vertical axis and then go down to the conical bottom. A combination of the downward flow and the centripetal forces results in efficient use of the grit removal chamber.

Normally, at least two (2) aeration tank-clarifiers are employed, and preferably four (4) to six (6) aeration tank-clarifiers, to maximize the operation (additional tank-aeration clarifiers are not shown in FIG. 1). From the grit removal chamber(s), the wastewater flow is conveyed to a split chamber 5 that distributes the wastewater between two or more aeration tanks-clarifiers. The degritted wastewater is subsequently conveyed to a particular aeration tank-clarifier 6 for subsequent biological treatment.

The aeration tank-clarifier provides biochemical oxidation of organic impurities as well as separation of the treated effluent from the activated sludge in a fluidized bed. The biochemical oxidation process occurs in both the suspended activated sludge floc in the aeration chamber and in the fluidized bed. Oxygen supply to the aeration tank-clarifier is provided by air blower 7. After disinfection, the biologically treated effluent is removed to discharge or recycling. For disinfection, sodium hypochlorite made in a separate unit 8 is used. The excess sludge from the aeration tank-clarifier is removed to a sludge thickener 9 from which the thickened sludge is pumped by pumping unit 15 to the dewatering unit (filter press) 11. The supernatant is removed from thickener 9 to chamber 10 equipped with submersible pump and then pumped back for biological treatment. The dewatering process in the filter press is enhanced with a flocculant solution prepared in unit 12. The solid wastes such as dewatered sludge and grit are collected in containers 13, then disposed to a landfill.

The degritted wastewater is conveyed to an aeration tank-clarifier 6 for subsequent biological treatment. From the grit removal chamber(s) the wastewater flow is conveyed to a split chamber 5. The aeration tank-clarifier provides biochemical oxidation of organic impurities as well as separation of the treated effluent from the activated sludge in a fluidized bed. The biochemical oxidation process occurs in both the suspended activated sludge floc in the aeration chamber and in the fluidized bed. Oxygen supply to the aeration tank-clarifier is provided by air blower 7. After disinfection, the biologically treated effluent is removed to discharge or recycling. For disinfection, sodium hypochlorite made in a separate unit 8 is used. The excess sludge from the aeration tank-clarifier is removed to a sludge thickener 9 from which the thickened sludge is pumped by pumping unit 15 to the dewatering unit (filter press) 11. The supernatant is removed from thickener 9 to chamber 10 equipped with submersible pump and then pumped back for biological treatment. The dewatering process in the filter press is enhanced with a flocculant solution prepared in unit 12. The solid wastes such as dewatered sludge and grit are collected in containers 13, then disposed to a landfill.

Figure 2:
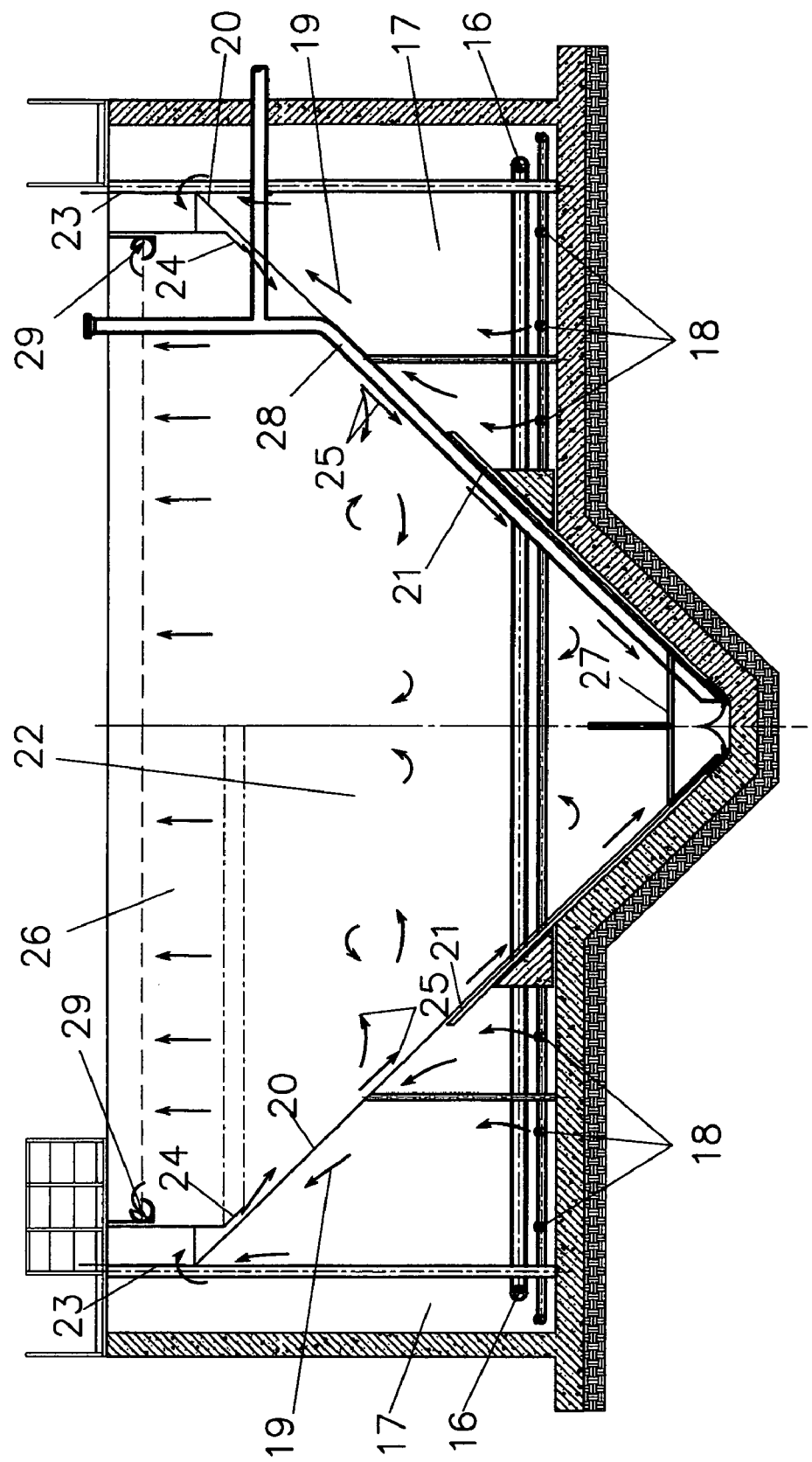
FIG. 2 is a typical schematic sectional front view of a packaged modular type unit ("MTU") which can be a cylindrical, rectangular, or polygonal inventive facilities for accomplishing the hydraulic pattern of the inventive method.

The cross sectional schematic of the hydraulic pattern of the aeration tank-clarifier is illustrated in FIG. 2. The wastewater enters the modular biological reactor (aeration tank-clarifier) through the perforated ring-shape raw wastewater inlet pipe 16 located in aeration zone 17. Compressed air is supplied to the aeration zone through the urethane diffusers 18 installed on several ring-shape air distribution pipes. The incoming wastewater is instantly mixed in the aeration zone with the activated sludge (mixed liquor suspended solids—MLSS) and with air. Floating air bubbles are formed into a strong upward flow 19 along the system of baffles 20, and intensive circulation and mixing in the aeration zone is provided. This upward flow also provides suction from the upper end of the recirculation tubes 21 thus resulting in suction from the clarification zone 22. The velocities of the recirculation flow are typically in the range of about 0.5-5.0 cm/sec. The MLSS upward flow in the upper portion of the aeration zone overflows through the sluice gates 23 into the clarification zone. Director baffles 24 direct the flow downward along the system of baffles on the upper surface of the conical baffles thus creating a torch-type flow 25 coming out of the space between the system of baffles and the director baffles. The torch-type flow expands and splits into two portions—one going along the system of baffles to the bottom enhanced by the suction effect in the lower end of the recirculation tubes, and another one going upward towards the center of the clarification zone thus creating internal circulation in the clarification zone. The stripping typically occurs with an air-to-water ratio in the range of about 50-300. In the clarification zone, at the level of the lower end of the director baffles, the vertical component of flow velocities is sufficiently low to prevent activated sludge floc carrying over above this level, and the activated sludge settles down towards the bottom of the clarification zone. Eventually, a fluidized bed is formed in the middle of the clarification zone. Thus the separation of activated sludge or other reagent from the treated effluent occurs by filtration through the fluidized bed. There is a buffer zone 26 above the fluidized bed level that allows expanding the fluidized bed, thus compensating for the hydraulic peak flow. Recirculation of the activated sludge or another reagent between the aeration zone from where it is removed to an intermediate tank and then pumped by a centrifugal or submersible pump to a dewatering unit (that is a filter press). These steps are not shown in FIG. 2. The clarification zone is enhanced by the air lift system 27 installed in the clarification zone. The excess sludge is removed by pipe 28 installed in the clarification zone. The treated effluent is collected by the collection trough 29 and conveyed to the unit outlet.

It is noteworthy that the process is not temperature dependent and typically takes place at temperatures of about 12° to 36° C. (about 53.6° to 96.8° F.).

The biologically treated effluent is subjected to disinfection either using dry chlorine or sodium hypochlorite.

The following example is illustrative of the invention.

EXAMPLE

A modular wastewater treatment unit suitable for municipal use was constructed in western Asia. The treatment efficiency was tested by determining operational data. The average MLSS concentration during an operational period of 16 months was 5,125 mg/L. The major treatment process characteristics during the final 20 days in the 16th month are set forth below.

The operational data below show complete oxidation of ammonia to nitrates in course of the nitrification process which was achieved due to the high MLSS concentration, i.e. at low BOD removal rates, as designed.

TREATED EFFLUENT CHARACTERISTICS IN THE MODULAR WASTE WATER TREATMENT UNIT

| | Treated Effluent Parameters, mg/L | | | | | | | |
|---|---|---|---|---|---|---|---|---|
| Day | $BOD_5$ | COD | TSS | $O_2$ | $Cl_2$ | $NH_4^+$ | $N-NO_2$ | $N-NO_3$ |
| 1 | 10.6 | 24.0 | 20.0 | 1.84 | | 2.75 | 10.5 | 61.0 |
| 2 | 12.4 | 26.0 | 19.5 | 1.69 | | 2.80 | 9.8 | 62.0 |
| 3 | 9.3 | 23.0 | 19.0 | 2.81 | | 2.85 | 11.0 | 62.0 |
| 4 | 8.5 | 25.4 | 20.0 | 1.69 | | 2.90 | 12.5 | 61.5 |
| 5 | 9.5 | 24.8 | 20.5 | 2.81 | 1.85 | 2.20 | 8.2 | 59.0 |
| 6 | 9.0 | 23.5 | 19.5 | 1.51 | 1.85 | 2.70 | 9.5 | 61.0 |
| 7 | 10.1 | 26.9 | 20.5 | 2.32 | 1.85 | 2.95 | 6.8 | 62.5 |
| 8 | 9.4 | 24.6 | 20.0 | 1.73 | | 8.20 | 6.1 | 58.5 |

-continued

TREATED EFFLUENT CHARACTERISTICS IN THE MODULAR WASTE WATER TREATMENT UNIT

| | Treated Effluent Parameters, mg/L | | | | | | | |
|---|---|---|---|---|---|---|---|---|
| Day | $BOD_5$ | COD | TSS | $O_2$ | $Cl_2$ | $NH_4^+$ | $N-NO_2$ | $N-NO_3$ |
| 9 | 8.5 | 26.1 | 19.0 | 3.02 | | 5.80 | 6.0 | 60.5 |
| 10 | 9.8 | 27.0 | 19.5 | 1.45 | | 5.40 | 5.8 | 61.0 |
| 11 | 15.5 | 48.0 | 18.5 | 1.69 | | 7.80 | 9.2 | 56.4 |
| 12 | 11.0 | 32.0 | 19.5 | 2.75 | | 7.40 | 8.8 | 57.0 |
| 13 | 12.3 | 33.6 | 19.0 | 2.91 | | 7.90 | 10.5 | 60.5 |
| 14 | 14.0 | 8.0 | 20.0 | 1.55 | | 5.85 | 9.8 | 62.0 |
| 15 | 13.3 | 40.0 | 20.5 | 1.45 | | 6.40 | 11.5 | 61.0 |
| 16 | 14.3 | 44.0 | 20.0 | 3.79 | | 6.20 | 9.6 | 63.0 |
| 17 | | 38.4 | 20.5 | 2.81 | | 6.35 | 10.5 | 60.5 |
| 18 | | 76.8 | 21.5 | 3.02 | | 2.05 | 18.2 | 54.0 |
| 19 | | 53.8 | 21.0 | 2.91 | | 3.40 | 14.6 | 58.5 |
| 20 | | 46.1 | | 2.78 | | 4.60 | 12.0 | 61.0 |
| Average | 11.09 | 33.6 | 19.89 | 2.33 | 1.85 | 4.83 | 19.5 | 60.15 |
| Regulatory Limit | 15.0 | 35.0 | 20.0 | ≧2.00 | >1.50 | — | — | — |
| Raw wastewater | 240 | 180 | 220 | 0 | 0 | 80.0 | 0 | 0 |
| Treatment efficiency, % | 95.4 | 81.3 | 91.0 | — | — | 94.0 | — | — |

Note:
$BOD_5$ is "Five-day Biochemical Oxygen Demand"
COD is "Chemical Oxygen Demand"
TSS is "Total Suspended Solids"
$O_2$ is "Dissolved Oxygen"
$Cl_2$ is "Free chlorine"
$NH_4^+$ is "Ammonia Nitrogen" or "Kjeldahl Nitrogen"
$N-NO_2$ is "Nitrite Nitrogen"
$N-NO_3$ is "Nitrate Nitrogen"

What is claimed is:

1. In a packaged modular biological fluidized bed reactor system containing an aeration tank-clarifier for continuously reducing organic biodegradable impurities in wastewater comprising:
   a. An inlet pipe to introduce said wastewater into said modular biological fluidized bed system,
   b. a high efficiency grinding disintegrator to grind organic biodegradable impurities in wastewater,
   c. a head suppression chamber for receiving and conveying the wastewater with the ground particles,
   d. a tangential grit removal chamber that receives wastewater with said ground particles, said tangential chamber having a conical bottom wherein said ground particles settle,
   e. a container placed below said tangential chamber to receive said ground particles from said conical bottom of said tangential chamber,
   f. a split chamber to receive said wastewater from which said ground particles have been removed and
   g. at least one aeration tank-clarifier capable of receiving blown air which provides hydraulic recirculation provided by oxygen supplied from an air blower and disinfectant is supplied from a unit outside of said aeration tank-clarifier, wherein remaining organic impurities in said wastewater are biochemically oxidized and disinfected and said wastewater and an activated sludge are separated from the clarified effluent of said wastewater in a fluidized bed;
   the improvement wherein a system of baffles and recirculation tubes are present such that said oxygen provided by said air blower into said aeration tank-clarifier is capable of flowing along said system of baffles and sucked into the upper ends of said recirculation tubes to enhance air flow in said aeration tank-clarifier upon exiting from the lower ends of said recirculation tubes; thereby providing conditions for aeration, formation of a fluidized bed and liquid mass recirculation flow between all hydraulic circulation zones in said aeration tank-clarifier to result in a high reactor mass concentration within reaction volumes.

2. The modular biological fluidized bed reactor system according to claim 1, further comprising a sludge thickener to receive said sludge formed in said aeration tank-clarifier, and a pumping unit to pump said activated sludge into a dewatering unit present to remove said activated sludge from said pumping unit and separate said activated sludge from a supernatant to permit said supernatant to be pumped back to said split chamber for further removal of remaining biodegradable impurities.

3. The modular biological fluidized bed reactor system according to claim 1, wherein said aeration tank-clarifier is one of cylindrical rectangular or polygonal in shape.

4. In a biological fluidized bed reactor system which comprises
   a. a high efficiency grinding disintegrator operable to grind organic biodegradable impurities in wastewater to a particle size of 6 mm or less, and
   b. a grit removal chamber in fluid communication with the grinding disintegrator,
   c. an aeration tank-clarifier in fluid communication with said grit removal chamber, said aeration tank-clarifier providing a zone for hydraulic recirculation,
   d. an oxygen supply in fluid communication with the aeration tank-clarifier, and
   e. a supply of disinfectant in fluid communication with the aeration tank-clarifier, wherein the air blower, disinfectant, and aeration tank-clarifier are operable to biochemically oxidize and disinfect said wastewater;

the improvement wherein a system of baffles and recirculation tubes are present such that said oxygen provided by said air blower into said aeration tank-clarifier is capable of flowing along said system of baffles and sucked into the upper ends of said recirculation tubes to enhance air flow in said aeration tank-clarifier upon exiting from the lower ends of said recirculation tubes.

5. The biological fluidized bed reactor system according to claim 4, wherein said grit removal chamber defines a conical bottom.

6. The biological fluidized bed reactor system according to claim 4, wherein an activated sludge is separated from a clarified effluent of said wastewater in a fluidized bed of the aeration tank-clarifier.

7. The biological fluidized bed reactor system according to claim 4, further comprising:
   a sludge thickener to receive a sludge formed in said aeration tank-clarifier, and
   a pumping unit to pump said sludge into a dewatering unit to separate said sludge from a supernatant.

8. The biological fluidized bed reactor system according to claim 4, comprising from four (4) to six (6) aeration-tank clarifiers.

9. The biological fluidized bed reactor system according to claim 8, further comprising a split chamber that distributes the wastewater between the plurality of aeration tank-clarifiers.

10. The biological fluidized bed reactor system according to claim 4, further comprising a head suppression chamber in fluid communication with the said grinding disintegrator.

11. The biological fluidized bed reactor system according to claim 4, further comprising a container placed below said grit removal chamber to receive ground particles.

12. The packaged modular biological fluidized bed reactor system of claim 1, wherein a single aeration tank-clarifier is present.

13. The packaged modular biological fluidized bed reactor system claimed in claim 1 wherein said high efficiency grinding disintegrator is capable of grinding said organic biodegradable impurities in wastewater to a particle size of 6 mm or less.

14. The packaged modular biological fluidized bed reactor system of claim 1, wherein said high reactor mass concentration is measured as mixed liquor suspended solids (MLSS) at at least 5,000 mg/L.

* * * * *

UNITED STATES PATENT AND TRADEMARK OFFICE
CERTIFICATE OF CORRECTION

| | | |
|---|---|---|
| PATENT NO. | : 8,025,798 B2 | Page 1 of 1 |
| APPLICATION NO. | : 12/075045 | |
| DATED | : September 27, 2011 | |
| INVENTOR(S) | : Mark Y. Kigel et al. | |

It is certified that error appears in the above-identified patent and that said Letters Patent is hereby corrected as shown below:

Cover page, item (75) Inventors, correct the name of the second listed inventor to
--Oleksandr O. Kovalenko--

Signed and Sealed this
Twentieth Day of December, 2011

David J. Kappos
*Director of the United States Patent and Trademark Office*